United States Patent [19]

van der Lely et al.

[11] 4,352,268
[45] Oct. 5, 1982

[54] HAYMAKING MACHINES

[75] Inventors: Ary van der Lely, Maasland; Cornelis J. G. Bom, Rozenburg, both of Netherlands

[73] Assignee: C. van der Lely N.V., Maasland, Netherlands

[21] Appl. No.: 218,099

[22] Filed: Dec. 19, 1980

[30] Foreign Application Priority Data

Dec. 21, 1979 [NL] Netherlands ............... 7909234

[51] Int. Cl.³ .......................................... A01D 79/06
[52] U.S. Cl. ......................................................... 56/370
[58] Field of Search ................ 56/370, 192, 400, 377

[56] References Cited

U.S. PATENT DOCUMENTS 3,720,053  3/1973  Zweegers ........................... 56/370
3,992,863  11/1976  van der Lely et al. ............ 56/370

*Primary Examiner*—Jay N. Eskovitz
*Attorney, Agent, or Firm*—William B. Mason

[57] ABSTRACT

A haymaking machine has at least one rake member, preferably two members, with tine groups that are rotatable about an upwardly directed axis. Adhesion of hay and/or other crop to the tine groups is greatly reduced, as compared with conventional constructions, by arranging fastening spoke ends between the helical coils of each tine group. A spring-loaded setting device is arranged to co-operate with a retaining bracket of each tine group to retain the tines, and corresponding tine carrier portions, in either a position suitable for swath formation or a position suitable for tedding operation. Each spoke end is substantially rigidly clamped between the corresponding turnably mounted coils of the tine groups and the spokes extend directly away from their connections between the coils towards the axis of rotation of the rake member. Guides at the rear of the machine assist to deposit the crop in swaths or the guides can be set to ted the crop.

14 Claims, 4 Drawing Figures

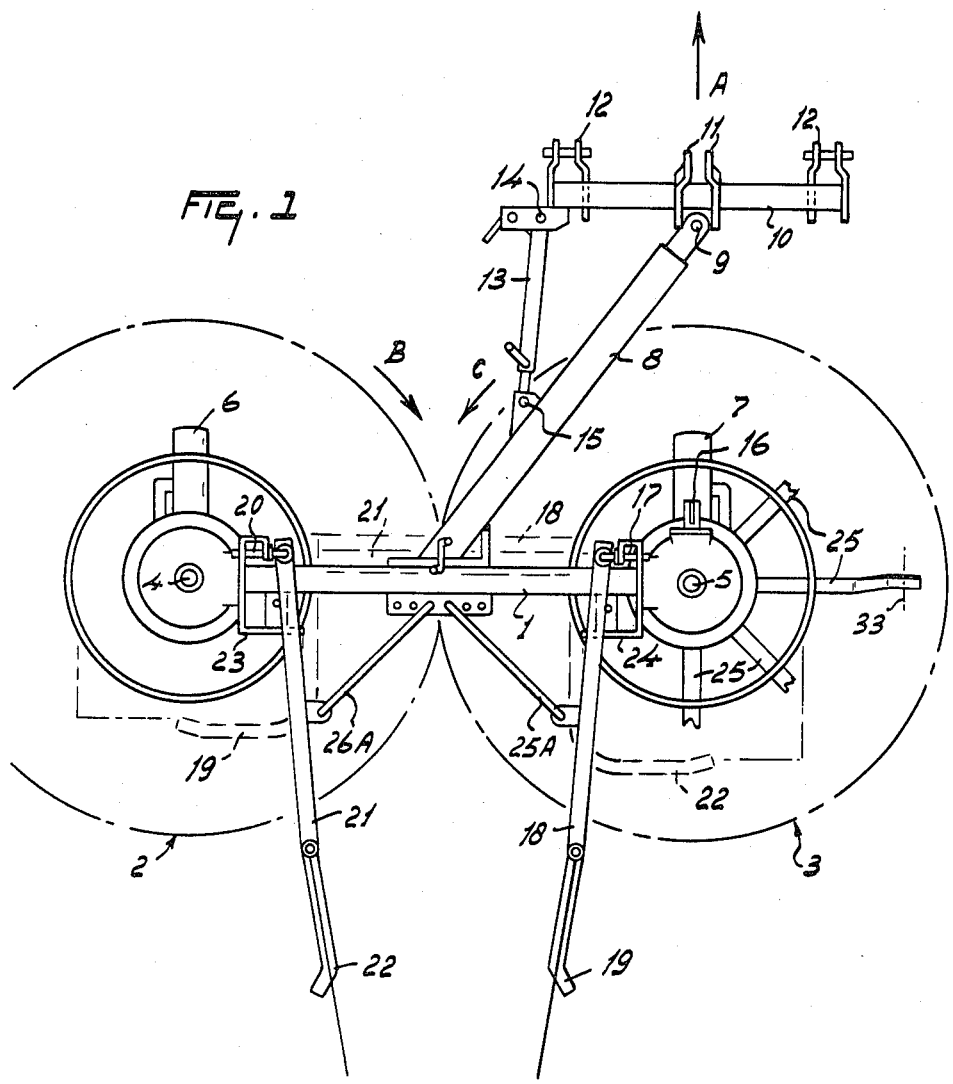

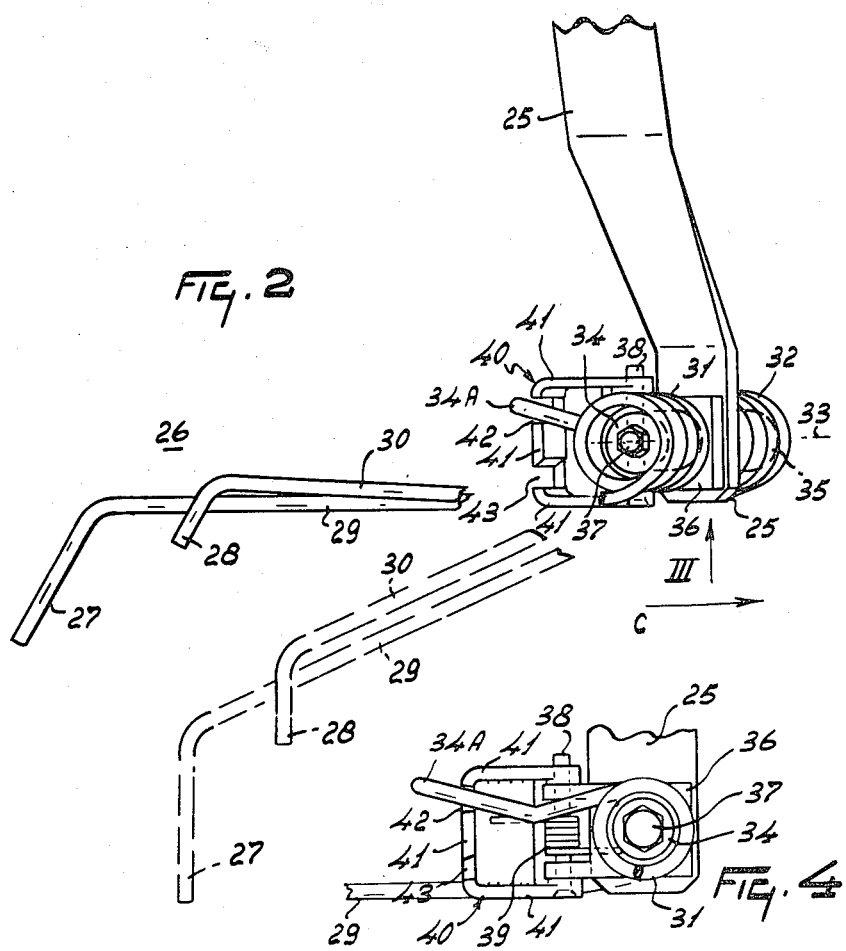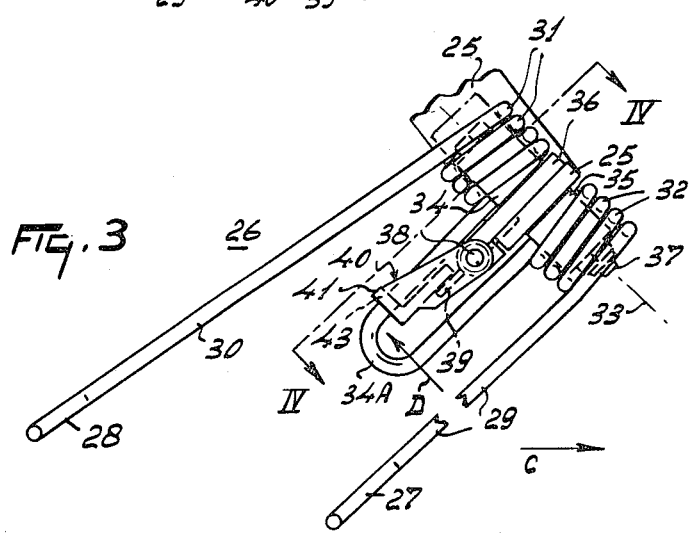

HAYMAKING MACHINES

This invention relates to haymaking machines of the kind which comprise at least one rake member arranged to be driven to rotate about an upwardly directed (non-horizontal) axis, said rake member being provided with at least one group of crop-displacing tines in which each tine of the group is arranged on a fastening part by way of connecting means, the fastening part supporting said group relative to other portions of the rake member.

There is a strong tendency for loose hay and/or other crop to adhere tenaciously to the tine groups in known machines of the above kind, and also to adhere to both the connecting means (for example, coils that are integral with the tines of the groups) and the fastening parts (for example, spokes of the rake member) and this adhesion of hay and/or other crop adversely affects the operation of the known machines to a considerable extent.

An object of the present invention is so to arrange the parts in a haymaking machine of the kind set forth that disadvantageous adhesion of hay and/or other crop is very significantly reduced as compared with known machines and, accordingly, there is provided a haymaking machine of the kind set forth, wherein said fastening part supports the tine group in a region between the connecting means and is substantially rigidly secured to those connecting means at least when the machine is in operation, and wherein said fastening part extends directly away from the region between the connecting means where it supports the tine group.

For a better understanding of the invention, and to show how the same may be carried into effect, reference will now be made, by way of example, to the accompanying drawings, in which:

FIG. 1 is a plan view of a haymaking machine in accordance with the invention,

FIG. 2 is a plan view, to an enlarged scale, illustrating a group of tines of one of two rake members of the machine of FIG. 1 in detail, FIG. 3 is an elevation as seen in the direction indicated by an arrow III in FIG. 2, and FIG. 4 is a section taken on the line IV—IV in FIG. 3.

Referring firstly to FIG. 1 of the accompanying drawings, the haymaking machine that is illustrated therein comprises a substantially horizontally disposed main frame beam 1 that extends transverse to the intended direction of operative travel of the machine, which is indicated in FIG. 1 by an arrow A, said beam 1 being substantially horizontally perpendicular to the direction A when the machine occupies the position of adjustment thereof which is shown in FIG. 1. Two rake members or rake heads 2 and 3 that are indicated only skeletally in FIG. 1 of the drawings are mounted at the opposite ends of the main frame beam 1 so as to be rotatable about corresponding upwardly directed (non-horizontal) axes 4 and 5 which axes 4 and 5 are parallel to one another, being contained in a common substantially, but not truly, vertical plane that is inclined to the strictly vertical at an angle of not less than 5° and not more than 20°. The plane which contains the axes 4 and 5 is inclined upwardly and forwardly from the ground surface with respect to the direction A. The two rake members 2 and 3 are supported from beneath by corresponding ground wheels 6 and 7 that are freely rotatable about respective substantially horizontal axle shafts. Known means which is not illustrated in the drawings is provided by which the ground wheels 6 and 7 can be raised and lowered relative to the rake members 2 and 3, said means including mechanism to maintain the ground wheels in chosen height adjustments relative to the rake members. Naturally, since the wheels 6 and 7 remain in contact with the ground when the machine is in operation, it is actually the height of the rake members 2 and 3 and the frame of the machine above the ground surface that is influenced by an upward or downward adjustment of the ground wheels 6 and 7 relative to the rake members 2 and 3.

The rearmost end, with respect to the direction A, of an arm 8 is rigidly secured to the main frame beam 1 of the machine at a location substantially midway along the length of the latter. As can be seen in the plan view of FIG. 1, the arm 8 extends obliquely forwardly from the main frame beam 1, the length of said arm 8 and its angle of oblique inclination to the main frame beam 1 being such that, when the machine is viewed from the rear in the direction A, the leading end of the arm 8 is substantially in register, in the direction A, with the upwardly directed axis of rotation 5 of the rake member 3. The leading end of the arm 8 is pivotally connected to a coupling member or trestle 10 of the machine by a substantially vertical, or at least non-horizontal, pivot pin 9, the coupling member or trestle 10 being constructed and arranged for releasable connection to the three-point lifting device or hitch of an agricultural tractor or other operating vehicle and being of substantially inverted U-shaped configuration as seen in either front or rear elevation. A large bracket which includes a coupling point 11, located at the top and center of the trestle 10, includes a portion which establishes the pivotal connection to the leading end of the arm 8, the coupling point 11 being constructed for releasable connection to the upper adjustable-length lifting link of the three-point lifting device or hitch to which the machine is attached when it is in use. Two further coupling points 12 are arranged near to the lowermost ends of the upright limbs of the coupling member or trestle 10 and are intended for connection to the rearmost ends of the two horizontally spaced apart lower lifting tanks of the same three-point lifting device or hitch.

That upright limb of the coupling member or trestle 10 which is nearest to the rake member 2 carries a horizontally disposed bracket to which the leading end of a telescopic set rod 13 is pivotally coupled by a substantially vertical, or at least non-horizontal, pivot pin 14. The rearmost end, with respect to the direction A, of the telescopic set rod 13 is turnably connected, by a further pivot pin 15, in parallel relationship with the pivot pin 14, to an anchorage mounted on the arm 8 at the side thereof which faces obliquely forwardly with respect to the direction A and approximately midway along the length of that side. The telescopic construction of the set rod 3 is known per se and, as illustrated somewhat diagrammatically in FIG. 1 of the drawings, it includes means to maintain it in any chosen one of a number of different length settings in each of which the inclination of the substantially horizontal main frame beam 1 to the direction A will be different. These different length settings are employed to spread hay or other crop laterally of the direction A in various directions and include the illustrated setting in which the beam 1 is substantially horizontally perpendicular to the direction A and a setting in which the overall width of the machine is reduced as much as possible to render the machine suitably disposed for inoperative transport when that setting is adopted.

The rake member 3 has a hub connected to a gear box from which a rotary input shaft 16 projects substantially horizontally forwards relative to the direction A. The rotary input shaft 16 is splined and is intended to be placed in driven connection with the power take-off shaft of the tractor or other operating vehicle, to which the coupling member or trestle 10 is connected, by way of a telescopic transmission shaft (not shown), of a construction which is known per se, having universal joints at its opposite ends. The gear box adjoining the hub of the rake member 3 is of a construction which is basically known per se and comprises pinions by which drive is transmitted from the input shaft 16 to a shaft which physically embodies the axis 5, the rake member 3 being secured to the latter shaft. The gear box under discussion also transmits rotary drive to a shaft which extends axially through the interior of the hollow main frame beam 1, said shaft projecting, at its opposite end, into a gear box which adjoins the hub of the rake member 2. Pinions within this basically known second gear box transmit rotary drive from the shaft that has just been discussed to a shaft which physically embodies the axis 4, the rake member 2 being fastened to the latter shaft. It will be noted that, in the embodiment which is being described, the drive transmission to the two rake members 2 and 3 is so arranged that, in use, they will rotate about the corresponding axes 4 and 5 in the opposite directions B and C that are indicated by arrows in FIG. 1 of the drawings, the arrow C also appearing in FIGS. 2 and 3 of the drawings.

The gear box which adjoins the hub of the rake member 3 carries a hinge shaft 17 which projects away from that gear box towards the companion rake member 2 and which, as seen in the plan view of FIG. 1 of the drawings, is substantially horizontally parallel to the main frame beam 1 and located a short distance in advance of that frame beam with respect to the direction A. The hinge shaft 17 is, in fact, located at a greater distance above ground level than is the top of the main frame beam 1 and the end thereof which is nearest to the frame beam 2 is bent over downwardly through 90° towards the ground surface, the exact inclination of the downwardly bent-over end relative to the ground surface at any time being dependent upon the particular position of adjustment of the machine. The lowermost extremity of the downwardly bent-over end of the hinge shaft 17 is spaced from the ground surface by the same distance as is the top of the main frame beam 1 or by a distance which is marginally greater than the latter spacing. The major portion of the hinge shaft 17 that extends parallel to the main frame beam 1, as seen in FIG. 1 of the drawings, is freely turnable in two spaced supports which form parts of a bracket 24 that will be referred to again below and that is secured to the gear box which lies above the hub of the rake member 3. One end of a carrier 18 for a hay or other crop guide member 19 is turnably mounted on the downwardly bent-over end of the hinge shaft 17 and can thus be turned about both that downwardly bent-over end and the longitudinal axis of the major portion of the hinge shaft 17 itself that is at right-angles to said downwardly bent-over end. It will be seen from FIG. 1 of the drawings that, when the machine is in use, the crop guide member 19 is located just rearwardly, with respect to the direction A, of the circular path that is traced by the outermost free ends or tips of tines of the rake member 3, said path being indicated by a broken circular line in FIG. 1 of the drawings. The crop guide member 19 is thus turnable about both of two relatively perpendicular axes, afforded by the hinge shaft 17, relative to the frame of the machine, said axes intersecting, or substantially intersecting, one another and one of them, but not the other, being fixed in position relative to the frame. It will immediately be apparent from a study of FIG. 1 of the drawings that, in association with the companion rake member 2 and its hub, there are provided a hinge shaft 20, a carrier 21, a crop guide member 22 and a bracket 23 which parts are substantially symmetrically identical to the parts 17, 18, 19 and 24 that have already been described.

As well as supporting the two hinge shafts 17 and 20, the respective brackets 24 and 23 have rear portions which lie beneath the corresponding carriers 18 and 21, when those carriers are in operative positions, to act as stops which limit the downward turnability of the carriers 18 and 21 and their guide members 19 and 22 about the horizontal or substantially horizontal axes which are afforded by the greater portions of the two hinge shafts 17 and 20 that are parallel or substantially parallel to the longitudinal axis of the main frame beam 1. The provision of these stops is most desirable to prevent the carriers 18 and 21 from turning too far downwardly when, for example, the whole machine is lifted clear of contact with the ground by raising the three-point lifting device or hitch to which, in use, it is connected. The two crop guide members 19 and 22 are substantially fixed in chosen operative positions, before any particular crop displacing work is started, by engaging the rearmost ends of corresponding links 25A and 26A in appropriate holes in a strip, which exhibits a plurality of such holes, secured to the rear of the main frame beam 1 substantially midway along the length thereof. It will be seen from FIG. 1 of the drawings that the rear ends of the two links are turnably connected to respective lugs mounted on the two carriers 18 and 21 substantially midway along the lengths of those carriers. When the machine is in operation, hay or other crop is delivered rearwardly in the directions B and C substantially wholly in a central region between the two rake members 2 and 3 and is thus subject to guiding influence by the members 19 and 22. It will be apparent that the adjustability thereof that is provided allows the machine to form swaths of different widths by arranging the guide members 19 and 22 in corresponding rearwardly convergent relationship 2 or, alternatively, to function as a tedder in which case the guide members 19 and 22 are arranged in rearwardly divergent relationship merely to limit the overall width of the strip of tedded hay or other crop that the machine produces. The crop can be displaced towards the left, or towards the right, of the path of travel of the machine by arranging the two guide members 19 and 22 in asymmetrical positions relative to a vertical plane that is parallel to the direction A and that contains the point of contact or region of overlap of the two broken line circles which are shown in FIG. 1 of the drawings to denote the paths traced by the outermost free ends or tips of the tines of to two rake members 2 and 3.

The crop guide member 19 is in the form of a downwardly projecting rigid tubular member whose upper end is secured to the rearmost end of the corresponding carrier 18. The lowermost end of this tubular member is bent over substantially horizontally, to make sliding engagement with the ground surface and with any crop that may be lying thereon, and has an obliquely outwardly directed extremity. The upright portion of the tubular member carries a plurality of spaced but parallel and rearwardly projecting substantially horizontal rods that are advantageously formed from a resilient material such as spring steel. The crop guide member 22 is of symmetrically identical construction and it will be apparent that the spring steel or other resilient rods of each guide member are secured to the remainder of that guide member only at their leading ends. It will be apparent from FIG. 1 of the drawings that, in the illustrated position, the rearmost ends of the spring steel or other rods of the two guide members 19 and 22 are located behind, in the direction A, the rear extremities of the tubular portions of the two guide members 19 and 22 that make sliding contact with the ground surface.

Each of the two rake members 2 and 3 comprises a plurality, such as eight, of connecting parts in the form of spokes 25 which spokes, when the rake member 2 or 3 concerned is viewed lengthwise of its axis of rotation 4 or 5, are radially disposed with respect to that axis at regular 45° intervals therearound but which spokes, in fact, are inclined downwardly by a few degrees from their inner towards their outer ends, said inner ends being secured to the corresponding hub that is rotatable relative to the respective non-rotary gear box. Each spoke 25 is formed from strong strip-shaped material that is of oblong cross-section, the longer sides of the cross-section being substantially at right-angles to the corresponding axis 4 or 5. All the spokes 25 of each rake member are interconnected by a circular felly whose center of curvature substantially coincides with the corresponding axis 4 or 5.

FIGS. 2 to 4 inclusive of the drawings show that the radially outermost end of each spoke 25 is provided with a corresponding group 26 of two of the aforementioned tines which two tines are indicated by the references 27 and 28. The two tines 27 and 28 of each group 26 are, in fact, the outermost ends of a single length of spring steel rod and project more or less radially outwards relative to the corresponding axis 4 or 5. The two tines 27 and 28, proper, of the group 26 which is shown in FIGS. 2 to 4 of the drawings are integrally connected by bends to carrier portions 29 and 30 of the group, these carrier portions 29 and 30 being directed obliquely upwardly and forwardly from the tines 27 and 28 with respect to the direction of rotation B or C concerned, it being a group of the rake member 3 that is shown in FIGS. 2 to 4 of the drawings and it therefore being the direction of rotation C which is involved. When the group 26 is considered in a direction that is parallel to the respective axis 4 or 5, the tine carrier 29 of each group 26 is located substantially registeringly beneath the associated tine carrier 30. The two tine carriers 29 and 30 of each group 26 are of substantially rectilinear formation and, at the ends thereof which are remote from the respective tines 27 and 28, proper, said carriers 29 and 30 merge integrally into corresponding helical coils 32 and 31, said coils 32 and 31 affording connecting means by which the two tines 27 and 28 of the group 26 are coupled to the illustrated spoke 25 of the rake member 3. Although wound in opposite directions, the two helical coils 31 and 32 have a common longitudinal axis or centerline 33. The ends of the two helical coils 31 and 32 which are closest to one another are integrally interconnected by a substantially U-shaped bracket 34A (see FIG. 3) which bracket 34A projects away from the coils 31 and 32 in substantially, although not exactly, the same direction as the respective carrier portions 29 and 30 (see FIGS. 2 and 4 of the drawings). It will be particularly noted from FIG. 2 of the drawings that the bracket 34A is located radially inwardly towards the axis of rotation 5 from the carrier portions 29 and 30 of the illustrated group 26 and, as seen in FIG. 2, is inclined at an angle of substantially 20° to the carrier portions 29 and 30. It is emphasised again that the whole tine group 26, which comprises the tines 27 and 28, the carrier portions 29 and 30, the coils 32 and 31 and the bracket 34A, is formed from a single length of appropriately shaped spring steel rod or, alternatively, heavy gauge wire.

It will be seen from the substantially radial elevation of FIG. 3 of the drawings that, considered in the intended direction of operative rotation C of the rake member 3, the common longitudinal axis or centerline 33 of the two coils 31 and 32 is downwardly and forwardly inclined at an angle of substantially 45° to the ground surface. The illustrated tine group 26 is actually fastened to its spoke 25 at a location which is between the two coils (connecting means) 31 and 32 and it will be seen that, in order to obtain the disposition of the longitudinal axis or centerline 33 that has just been mentioned, the outer end of the spoke 25 has to be twisted into an oblique position relative to the remainder thereof. The outer end of the spoke 25, which is located between the two coils 31 and 32, is thus so disposed that the longer sides of its oblong cross-section are at right-angles to the longitudinal axis or centerline 33.

The coils 31 and 32 are arranged turnably around corresponding coaxial sleeves 34 and 35, the common longitudinal axis thereof coinciding with the longitudinal axis or centerline 33 of the coils 31 and 32 themselves. A holder 36 in the form of a plate is also located between the two coils 31 and 32, being disposed alongside the coil 31 with its lower flat surface in abutting contact with the oblique upper flat surface of the outer end of the spoke 25. The opposite flat surfaces of the principally planar holder 36 and spoke end 25 are thus also at right angles to the longitudinal axis or centerline 33 of the coils 31 and 32. The ends of the two sleeves 34 and 35 which adjoin the upper oblique surface of the holder 36 and the lower oblique surface of the spoke end 25, respectively, are clamped firmly against those two surfaces by a bolt 37, provided with a co-operating vibration-resistant nut and washers, which bolt 37 extends axially through the sleeves 34 and 35 and their surrounding coils 31 and 32 with its longitudinal axis again substantially coinciding with the axis or centerline 33. The spoke end 25 and holder 36 are, of course, formed with registering holes through which pass the shank of the bolt 37 but these holes are not of sufficient diameter to weaken either of those parts to any significant extent. The bolt 37 also acts to clamp the abutting flat surfaces of the spoke end 25 and holder 36 firmly against one another and it will be noted that, in each position of the adjustable tine group 26, said holder 36 is located radially inwardly towards the axis 5 from the carrier portions 29 and 30 of the group 26 so that there is very little risk of hay or other crop adhering to the holder 36 when the machine is in use.

It can be seen from FIG. 3 of the drawings that the aforementioned bracket 34A that is located radially inwardly from the carrier portions 29 and 30 of the tine group 26 embraces the spoke end 25 and holder 36 by way of the two limbs of its substantially U-shaped configuration. The non-planar portion of the holder 36 comprises a pair of spaced lugs (FIG. 4) through aligned holes in which extends a pivot pin 38 whose longitudinal axis is in perpendicular, but spaced, relationship with the axis or centerline 33. A coil spring 39 surrounds the shaft 38 between the two lugs of the holder 36 and opposite straight ends of said coil spring 39 bear against the lower oblique flat surface of the holder 36 and the lower flat surface of a setting device 40, respectively, in such a way that said setting device 40 is urged to turn upwardly in a clockwise direction about the pivot pin 38 as seen in FIG. 3 of the drawings. The setting device 40 is of substantially rectangular shape as viewed in a direction parallel to the longitudinal axis or centerline 33 of the coils 31 and 32 and includes lugs which engage the opposite ends of the pivot pin 38 in such a way as to enable said setting device to turn upwardly or downwardly about the pin 38, it being remembered that the coil spring 39 normally acts to turn the setting device 40 upwardly about the pin 38.

The substantially rectangular setting device 40 has an upright rim 41 which rim is formed, in a portion thereof that is spaced from the axis or centerline 33, with two recesses 42 and 43. The bracket 34A embraces the setting device 40 (see FIG. 3) and, upon appropriate manipulation of the tine group 26, the coil spring 39 will urge the setting device 40 into the position which is shown in full lines in FIGS. 2, 3 and 4 of the drawings in which the upper limb of the bracket 34A is in the recess 42. FIG. 2 of the drawings shows, in broken lines, a position of the parts 27, 28, 29 and 30 of the group 26 which corresponds to the upper limb of the bracket 34A being fitted into the recess 43 of the setting device rim 41 rather than in the recess 42. The bracket 34A constitutes a retaining member of the tine group 26 and is arranged to co-operate selectively with retaining means in the form of the recess 42 or the alternative recess 43.

In the use of the haymaking machine that has been described, the coupling points 11 and 12 of its coupling member or trestle 10 are connected to the three-point lifting device or hitch of an agricultural tractor or other towing and operating vehicle and the rotary input shaft 16 is placed in driven connection with the power take-off shaft of the same tractor or other vehicle by way of the aforementioned known intermediate telescopic transmission shaft (not shown) which has universal joints at its opposite ends. Clearly, the various adjustments which have been described will be effected, if required, before work commences having regard to the particular form of crop displacement which it is desired that the machine should produce. As the machine moves operatively in the direction A over hay or other crop that is lying upon the ground, the drive to the rotary input shaft 16 causes the two rake members 2 and 3 to revolve in the opposite directions B and C, respectively, the hay or other crop being engaged by the tines 27 and 28 of the tine groups 26 in leading regions, with respect to the direction A, of the two rake members 2 and 3 and being displaced by those tines 27 and 28 rearwardly in the directions B and C to the region between the two rake members 2 and 3 where the broken line circles that are shown in FIG. 1 of the drawings just intersect one another or, alternatively, overlap one another to some extent. It is noted that the drive transmission to the two rake members 2 and 3 is so arranged that, under the latter circumstances, the spokes 25 and the tine groups 26 which they carry, and which correspond to the respective rake members, will "intermesh" to avoid the two rake members fouling one another in the region of overlap. When each tine group 26 is arranged in the position shown in full lines in FIG. 2 of the drawings, that is to say, with the bracket 34A engaged in the recess 42, the tines 27 and 28 of the various groups 26 are inclined rearwardly to a small extent relative to the direction of rotation C or, in the case of the rake member 2, to the direction of rotation B. This disposition is suitable for the formation of the displaced hay or other crop into swaths and the displaced hay or other crop is delivered rearwardly of the machine between the crop guide members 19 and 22 which, in the position shown in FIG. 1 of the drawings, are in gently rearwardly convergent relationship with one another relative to the direction A. Under these circumstances, the hay or other crop is deposited upon the ground in the form of a sharply defined swath that is of a convenient formation for subsequent collection by a pick-up wagon or other farm implement or machine. As an alternative, the links 25A and 26A can be displaced to cause the guide members 19 and 22 to form the hay or other crop into a lower and broader so-called night swath.

When each tine group is arranged in a position corresponding to the one that is indicated in broken lines in FIG. 2 of the drawings in which position each bracket 34A is displaced from the recess 42 to the recess 43 of the corresponding setting member 40, the tines 27 and 28 project substantially radially with respect to the corresponding axes 4 and 5, this disposition thereof being appropriate to functioning of the machine as a tedder in which the hay or other crop is spread diffusely throughout a strip of ground which has substantially the same width as the working (pick-up) width of the machine. However, advantageously, the links 25A and 26A are arranged to retain the crop guide members 19 and 22 in a rearwardly divergent disposition which limits the width of the strip of land upon which the tedded crop falls. It is not, in fact, actually necessary to use the crop guide members 19 and 22 for tedding purposes and, if preferred, they may be disposed in the inoperative positions that are shown in broken lines in FIG. 1. This is achieved by disengaging the links 25A and 26A, turning the guide member 19 upwardly about the substantially horizontal axis which is defined by the hinge shaft 17 until the second axis which is defined by that hinge shaft is also substantially horizontally disposed and then turning said guide member 19 and its carrier 18 downwardly again about the last mentioned pivotal axis towards the rake member 2 until the inoperative broken line position that can be seen in FIG. 1 is achieved. Under these circumstances, the carrier 18 bears downwardly against a support which is provided substantially centrally along the main frame beam 1. The crop guide member 22 and its carrier 21 are brought to their inoperative position, as shown in broken lines in FIG. 1, in a substantially symmetrically similar manner. These positions of the two guide members 19 and 22 are also useful for inoperative transport purposes and, in such transport positions, instead of lying rearwardly of the rake members 2 and 3 relative to the direction A, the crop guide members 19 and 22 are disposed substantially horizontally above the rake member 2 and above the rake member 3, respectively. When in their inoperative transport positions, the two carriers 18 and 21 are located in front of, with respect to the direction A, and principally above the main frame beam 1 and are horizontally disposed or are inclined upwardly by a few degrees. It is noted that, in order to achieve their inoperative transport positions, the carriers 18 and 21 which correspond to the two crop guide members 19 and 22 can be slid lengthwise for short distances along the portions of the two hinge shafts 17 and 22 that are bent over downwardly as seen in FIG. 1 of the drawings and that afford the second displaceable axes which are defined by said hinge shafts.

The guide members 19 and 22 and their corresponding carriers are moved forwardly into their inoperative transport positions from their working positions and, consequently, the centers of gravity thereof are displaced forwardly together with the center of gravity of the whole machine. If the machine is raised clear of contact with the ground by the three-point lifting device or hitch of a tractor or other operating vehicle to which it is attached, less jolting will occur under such "lifted" conditions when the inoperative transport position of the crop guide members 19 and 22 is adopted as compared with leaving those guide members in their working positions. Nevertheless, the center of gravity of the whole machine is raised very little vertically, if at all, by adopting the inoperative transport positions of the crop guide members and this, it will be realised, can be an important consideration when both work, and inoperative transport, are to take place on significantly sloping land. The guide members 19 and 22 themselves are spaced apart from one another laterally of the direction A in both their working positions and their inoperative transport positions.

When each tine group 26 has to be moved from the swath-forming position that is shown in full lines in FIG. 2 of the drawings to the tedding position which is shown by broken lines in the same Figure, each setting device 40 is moved manually downwards, against the action of the corresponding coil spring 39 in a direction opposite to the arrow D in FIG. 3, until each bracket 34A is clear of the walls of the corresponding recess 42. As soon as this condition is reached for each tine group 26, the whole group can turn freely about the longitudinal axis or centerline 33 of its coils and said group can readily be turned until the bracket 34A thereof is in register with the corresponding recess 43. Each spring 39 will then turn the setting device 40 concerned upwardly in a clockwise direction about the respective pivot pin 38 as seen in FIG. 3 of the drawings until the bracket 34A is in engagement with the recess 43. As shown in FIG. 3 of the drawings, the setting device 40 is located substantially completely between the limbs of the bracket 34A, said bracket and the other parts of the same tine group 26 being turnable freely about the axis or centerline 33 with the inner surfaces of the coils 31 and 32 turning about the cylindrical outer surfaces of the sleeves 34 and 35 which latter accordingly act as tine holders. Each tine group 26 will remain retained in its tedding position as long as the corresponding setting device 40 is maintained with its recess 43 in engagement with the respective bracket 34A by the co-operating coil spring 39.

Apart from the resiliency of the spring steel from which each tine group 26 is preferably made, each such group is substantially rigidly connected to the outer end of the corresponding spoke 25 at a location between the two coils 31 and 32 concerned. It has been found that, with this relative arrangement of the fastening parts (spokes 25 or at least their outer ends), coils 31 and 32, carrier portions 29 and 30 and the tines 27 and 28 themselves of each tine group 26, adhesion of hay or other crop to those parts is dramatically reduced as compared with conventional arrangements and to such an extent that additional means, such as anti-adhesion screening hoods and the like, do not need to be employed. The fastening part (spoke 25 or at least its outer end) of each tine group 26 extends directly away from the region between the connecting means that is afforded by the corresponding coils 31 and 32 towards the axis of rotation 4 or 5 of the rake member 2 or 3 concerned and is either perpendicular, or very nearly perpendicular, to the respective axis or centerline 33. The coils 31 and 32 (connecting means) of each tine group 26 largely cover the outer surfaces of the corresponding spoke end 25 (fastening part) and/or may be arranged completely to cover at least the leading (with respect to the direction B or C) and outer edges of said spoke end 25.

The reduction in regard to hay or other crop adhesion which is attained in accordance with the present invention is particularly marked when a comparison is made with known ways of fastening tine groups to spokes or the like where the spoke or other fastening part of each group emerges from the upper end of a coil (corresponding to the present coil 31) or from the lower end of a coil (corresponding to the present coil 32) and is then bent round towards the axis of rotation of the rake member concerned. In the present case, and considered in the direction C in respect of the rake member 3, the cylindrically curved fronts of the coils 31 and 32, together with the tine carrier portions 29 and 30 which join those coils at radially outer locations thereon, constitute an effective guide for crop which the tine group 26 is approaching, this guide acting substantially to prevent crop adherence and also to maintain the spoke ends 25 substantially free of fouling by crop that is encountered by the machine during its progress in the direction A. It is important that, in each position of each tine group 26, the corresponding holder 36, setting device 40 and bracket 34A should be located radially inwardly of the two tine carrier portions 29 and 30 concerned relative to the axis of rotation 4 or 5 of the rake member 2 or 3 under consideration. The fastening parts of each rake member 2 and 3 need not be in the form of the elongate spokes 25 that have been described but could, as an alternative, be in the form of a circular rim or felly carrying a plurality of regularly spaced apart projections substantially corresponding to the outer ends of the spokes 25 that have been described above and that are illustrated in the accompanying drawings.

The term "rake member" is used throughout this specification as an abbreviation for "rake member or rake head" and it is noted that the invention is equally applicable to haymaking machines of alternative constructions to the one which is shown in the drawings in which the two rake members 2 and 3 rotate in the opposite directions B and C when the machine is in operation. For example, the invention is applicable to machines which exhibit only a single rake member, to machines having two or more rake members which all rotate in the same direction during use and to machines which exhibit two or more pairs of contra-rotatable rake members.

Although certain features of the haymaking machine that have been described, and/or that are illustrated in the accompanying drawings, will be set forth in the following claims as inventive features, it is emphasised that the invention is not necessarily limited to those features and that it includes within its scope each of the parts of the haymaking machine that has been described, and/or that is illustrated in the accompanying drawings, both individually and in various combinations.

We claim:

1. A haymaking machine comprising a frame and at least one rotatable rake member supported on said frame, said rake member having at least one tine group connected to an outer fastening part of a spoke, said group including at least two tines with respective connecting means and said fastening part being located between the connecting means to support said group, the leading sides of said connecting means and fastening part being relatively smooth with respect to the normal direction of rotation of said member, whereby crop adhesion to the rake member is reduced, said connecting means comprising respective coils for said tines and said spoke extending inwardly towards the rotational axis of said rake member from said coils away from the tine group, means clamping said group to the fastening part, said coils substantially covering the outer portion of the fastening part and protecting the clamping means from fouling crop.

2. A haymaking machine as claimed in claim 1, wherein each coil at least partly surrounds a corresponding sleeve, the two sleeves of said coils being clamped to the fastening part by a bolt that passes through a hole in said part.

3. A haymaking machine as claimed in claim 1, wherein at least one crop guide member is located to the rear of the rake member for influencing the direction of movement of displaced crop away from the machine, said guide member being pivoted to the frame to turn about two separate but substantially intersecting axes.

4. A haymaking machine as claimed in claim 3, wherein one of said intersecting axes is substantially horizontal and the other axis is substantially vertical in the working position of the crop guide.

5. A haymaking machine as claimed in claim 4, wherein said machine comprises at least two rotary rake members and the substantially horizontal pivotal axis of said guide member is substantially parallel to a horizontal line of connection between the axes of rotation of two rake members.

6. A haymaking machine as claimed in claim 5, wherein each of said two rake members has a corresponding crop guide member connected to said frame adjacent a respective central hub of that member, each of the guide members being pivotable to a position located at least partly above the non-corresponding rake member.

7. A haymaking machine as claimed in claim 6, wherein each guide member is elongated and its general plane is substantially horizontal in transport position.

8. A haymaking machine as claimed in claim 7, wherein said two guide members are spaced apart from one another, laterally of the normal direction of travel in transport position.

9. A haymaking machine comprising a frame and at least one rotatable rake member supported on said frame, said member comprising a central hub and outwardly extending projection means for mounting at least one tine group, said tine group including two tines that are vertically spaced apart from one another, the inner portions of said tines being mounted on respective sleeves and said sleeves having aligned longitudinal axes, the outer portion of said projection means extending between said sleeves and fastening means securing the sleeves and tines to said outer portion, a holder being clamped between said sleeves to said outer portion and a setting device connected to the trailing side of said holder with respect to the normal direction of rotation of the rake member, said setting device having multiple retaining means for the tine group and said group being settable in alternative working positions in which the tines are secured to outwardly extending tedding and swath forming positions.

10. A haymaking machine comprising a frame and at least one rotatable rake member supported on said frame, said rake member having at least one tine group connected to an outer fastening part of that member, said group including at least two tines with respective connecting means and said fastening part being located between the connecting means to support said group, the leading sides of said connecting means and fastening part being relatively smooth with respect to the normal direction of rotation of said member and said part extending inwardly towards the axis of rotation of said member, whereby crop adhesion to the rake member is reduced, said connecting means comprising respective coils for said tines and said coils being coaxially positioned with their longitudinal centerlines in common alignment and substantially perpendicular to the fastening part, said group being adjustably securable in position about said centerlines relative to the fastening part by a setting device, said device being pivoted to a holder that is connected to the fastening part adjacent said coils, resilient means biasing the setting device about its pivot axis to the holder to set the working position of said group.

11. A haymaking machine as claimed in claim 10, wherein said resilient means is a spring and said spring urges the setting device into a retaining position on said device for the tine group.

12. A haymaking machine as claimed in claim 10, wherein the outer fastening part is a portion of a spoke and said spoke is strip-shaped, said outer part being twisted relative to the remainder of the spoke so that the coil centerlines extend at an angle to the vertical.

13. A haymaking machine as claimed in claim 11, wherein said setting device comprises a plurality of retaining means arranged for selective co-operation with a locking member of said tine group.

14. A haymaking machine as claimed in claim 13, wherein said locking member is a bracket which interconnects said coils to one another.

* * * * *